United States Patent
Shin

(10) Patent No.: US 10,134,390 B2
(45) Date of Patent: Nov. 20, 2018

(54) ELECTRONIC DEVICE AND VOICE RECOGNITION METHOD THEREOF

(71) Applicant: SAMSUNG ELECTRONICS CO., LTD., Suwon-si (KR)

(72) Inventor: Sung-hwan Shin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/227,447

(22) Filed: Aug. 3, 2016

(65) Prior Publication Data

US 2017/0084267 A1 Mar. 23, 2017

(30) Foreign Application Priority Data

Sep. 23, 2015 (KR) .......................... 10-2015-0134465

(51) Int. Cl.
| | | |
|---|---|---|
| G10L 15/00 | (2013.01) | |
| G10L 15/06 | (2013.01) | |
| G10L 15/02 | (2006.01) | |
| G10L 25/51 | (2013.01) | |
| G10L 15/30 | (2013.01) | |
| G10L 17/06 | (2013.01) | |

(52) U.S. Cl.
CPC ............ G10L 15/063 (2013.01); G10L 15/02 (2013.01); G10L 15/30 (2013.01); G10L 17/06 (2013.01); G10L 25/51 (2013.01); *G10L 2015/025* (2013.01); *G10L 2015/0635* (2013.01)

(58) Field of Classification Search
CPC ... G10L 15/063; G10L 15/187; G10L 15/065; G10L 15/06; G10L 13/08

USPC ............. 704/239, 235, 231, 254, 4, E15.02, 704/E13.012, 270, 251, 257, 260, 704/E21.019, 275, 9, E15.04, 10

See application file for complete search history.

(56) References Cited

U.S. PATENT DOCUMENTS

| | | |
|---|---|---|
| 6,434,521 B1 | 8/2002 | Barnard |
| 7,280,963 B1 | 10/2007 | Beaufays et al. |
| 8,532,993 B2 | 9/2013 | Ljolje |
| 9,263,032 B2 * | 2/2016 | Meruva ................. G10L 15/063 |
| 9,640,175 B2 * | 5/2017 | Liu ........................ G10L 15/063 |
| 2007/0073541 A1 | 3/2007 | Tian |
| 2012/0253808 A1 | 10/2012 | Sugiura et al. |
| 2014/0180689 A1 | 6/2014 | Kim |
| 2014/0195238 A1 | 7/2014 | Terao et al. |

(Continued)

FOREIGN PATENT DOCUMENTS

| | | |
|---|---|---|
| JP | 2010-197644 A | 9/2010 |
| JP | 2011-232668 A | 11/2011 |

(Continued)

OTHER PUBLICATIONS

Anonymous, Wikipedia, "International Phonetic Alphabet", May 3, 2016, 32 pages total, https://en.wikipedia.org/wiki/International_Phonetic_Alphabet.

*Primary Examiner* — Charlotte M Baker
(74) *Attorney, Agent, or Firm* — Sughrue Mion, PLLC

(57) ABSTRACT

An electronic device includes a memory configured to store a user pronunciation lexicon, a voice input unit configured to receive a user's uttered voice, and a processor configured to extract a user pronunciation pattern from the received uttered voice and to update the user pronunciation lexicon according to a pronunciation pattern rule generated based on the extracted pronunciation pattern.

18 Claims, 13 Drawing Sheets

(56) References Cited

U.S. PATENT DOCUMENTS

2015/0006178 A1* 1/2015 Peng ................ G10L 15/18
                                                  704/254
2015/0106082 A1    4/2015 Ge et al.

FOREIGN PATENT DOCUMENTS

| | | |
|---|---:|---|
| JP | 5493537 B2 | 5/2014 |
| JP | 2014-170185 A | 9/2014 |
| JP | 2015-87544 A | 5/2015 |
| KR | 10-2005-0036303 A | 4/2005 |
| KR | 10-1333194 B1 | 11/2013 |
| KR | 10-2014-0051519 A | 5/2014 |
| KR | 10-2014-0057018 A | 5/2014 |

* cited by examiner

FIG. 4A

- PATTERN: USER 2 PRONOUNCES
  CONSECUTIVE 'H' WHICH COMES AFTER
  A CONSONANT 'N' AS 'W'
- CORRECTION METHOD: HANWHA EAGLES
  → HANWA EAGLES

- VOCALIZATION AND RECOGNITION
  RESULT: HANWHA EAGLES
  USER 1 : h a NN h wa i g ww LL s1 ww
  USER 2 : h a n wa i g ww LL s1 ww

FIG. 4B

- PATTERN: POOR IN PRONOUNCING
  CONSONANT 'H' AND VOWEL 'EU'
- CORRECTION METHOD:
  1. CONSIDER PHONEMES WHICH COMES
     BEFORE AND AFTER THE SUBJECT
     PHONEME (TRI-PHONES)
  2. REPLACE ALTERNATIVE TRI-PHONE
     THROUGH REGULARIZATION
  EXAMPLE) HANWHA EAGLES → HANWA EAGULS

- PHONEME UNIT OF RECOGNITION RESULTS CM
  h   a   NN  h   wa   i   g  ww  LL  sl  ww
  0.7 0.8 0.7 0.3 1.0 0.5 0.8 0.1 0.8 0.7 0.9

FIG. 5B

- PATTERN: POOR IN PRONOUNCING
  CONSONANT 'TH' -> PRONOUNCE AS 'S'
- CORRECTION METHOD
※ ALTERNATIVE THROUGH REGULARIZATION
  REPLACE TO TRI-PHONE
EXAMPLE) th r ow n x → s r ow n x

- RECOGNITION RESULTS:
  GAME OF THRONES
  g    ey   m   ah   v   th    r   ow   n    x
  0.7  0.8  0.7  0.6  8.0  0.2  0.6  0.8  0.7  0.7

ELECTRONIC DEVICE AND VOICE RECOGNITION METHOD THEREOF

CROSS-REFERENCE TO RELATED APPLICATION(S)

This application claims priority from Korean Patent Application No. 10-2015-0134465, filed on Sep. 23, 2015 in the Korean Intellectual Property Office, the disclosure of which is incorporated herein by reference in its entirety.

BACKGROUND

1. Field

Apparatuses and methods consistent with exemplary embodiments relate to an electronic device and a voice recognition method thereof, and more particularly, to an electronic device capable of performing voice recognition using a user pronunciation lexicon and a voice recognition method thereof.

2. Description of the Related Art

The voice recognition service compares a user's voice with a text (e.g., word or a combination of words) that were registered to a system at a development stage and provides the most probable text result. At this time, the text registered in the system is generally referred to as a word lexicon, and a supporting range of the voice recognition service is determined according to how many words are included in the word lexicon. Further, the performance of a voice recognition service depends on the accuracy of a pronunciation lexicon in the word lexicon and a quality of an acoustic model that corresponds thereto.

Generally, the pronunciation lexicon is developed in order to include as many pronunciation variations as possible. Especially, for names of content and foreign words, the pronunciation variation per user varies, and therefore, more than 5 to 10 pronunciation strings for a word are provided. At this time, the purpose of generating multi pronunciation strings is to satisfy an average recognition rate of unspecified individuals who use the voice recognition service.

Conventionally, it aimed at generating a pronunciation string that satisfies an average recognition rate of unspecified individuals. However, it was not possible to reflect a pronunciation habit or characteristic of an individual user with such generic pronunciation, and it was difficult to provide a satisfying voice recognition rate.

In addition, a personalized service that provides an individual pronunciation string lexicon was launched as to overcome such limitation, but no specific and reliable method of generating an individual pronunciation string was introduced. The biggest reason was that it was not easy to determine a way to regulate due to a great variance between users.

Conventionally, technologies that update a pronunciation string based on a simple pattern analysis from a user log were introduced, but a pattern-based regulation cannot help but include errors because the voice recognition results include misrecognized words. Such conventional pattern-based updating method of a pronunciation string has caused side effects that decreased the existing recognition rate.

SUMMARY

One or more exemplary embodiments address at least the above need, and an aspect of exemplary embodiments is to provide an electronic device capable of performing voice recognition based on a pronunciation lexicon which is updated based on an individual user's pronunciation pattern and a voice recognition method thereof.

According to an aspect of an exemplary embodiment, there is provided an electronic device including: a memory configured to store a user pronunciation lexicon; a voice inputter configured to receive a user's uttered voice; and a processor configured to extract a user pronunciation pattern from the received uttered voice and to update the user pronunciation lexicon according to a pronunciation pattern rule generated based on the extracted pronunciation pattern.

The processor may be further configured to, in response to the user's uttered voice being received, perform voice recognition based on the user pronunciation lexicon stored in the memory.

The processor may be further configured to calculate reliability per phoneme included in the uttered voice and extract the pronunciation pattern based on the calculated reliability.

The processor may be further configured to compare a pronunciation per phoneme stored in the pronunciation lexicon and a pronunciation per phoneme included in the user's uttered voice and calculate reliability per phoneme by determining a weight value according to a similarity.

The processor may be further configured to determine a different weight value according to the similarity per type of the phoneme included in the uttered voice and calculate the reliability per the phoneme based on the determined weight value.

The processor may be further configured to generate a variation rule for a predetermined word based on the generated pronunciation pattern rule and update the user pronunciation lexicon based on the generated variation rule.

The processor may be further configured to delete a pronunciation string that the user does not use for more than a predetermined number of times among the pronunciation strings stored in the user pronunciation lexicon and add the pronunciation string that is not stored in the user pronunciation lexicon among the pronunciation strings generated based on the pronunciation pattern rule to the pronunciation lexicon.

The device may include a communicator configured to perform communication with a cloud server, wherein the processor may be further configured to transmit the user pronunciation lexicon updated according to the generated pronunciation pattern rule to the cloud server.

The processor may be further configured to identify the user based on at least one among identification information inputted by the user and the received user's uttered voice and perform the voice recognition based on the user pronunciation lexicon that corresponds to the identified user.

According to an aspect of another exemplary embodiment, there is provided a voice recognition method of an electronic device including: receiving a user's uttered voice; extracting a user pronunciation pattern from the received uttered voice, and updating a user pronunciation lexicon according to a pronunciation pattern rule generated based on the extracted pronunciation pattern.

The method may include, in response to the user's uttered voice being received, performing the voice recognition based on the user pronunciation lexicon.

The extracting may include calculating reliability per phoneme included in the uttered voice and extracts the pronunciation pattern-based on the calculated reliability.

The extracting may include comparing a pronunciation per phoneme stored in the pronunciation lexicon and a pronunciation per phoneme included in the user's uttered voice and calculating the reliability per phoneme by determining a weight value according to a similarity.

The extracting may include determining a different weight value according to the similarity per type of a phoneme included in the uttered voice and calculating the reliability per phoneme based on the determined weight value.

The updating may include generating a variation rule for a predetermined word based on the generated pronunciation pattern rule and updating the user pronunciation lexicon based on the generated variation rule.

The updating may include deleting a pronunciation string that a user does not use for more than a predetermined number of time among the pronunciation strings stored in the user pronunciation lexicon and adding a pronunciation string that is not stored in the user pronunciation lexicon among the pronunciation strings generated based on the pronunciation pattern rule.

The method may include transmitting the user pronunciation lexicon updated according to the generated pronunciation pattern rule to a cloud server.

The method may include identifying the user based on at least one among identification information inputted by the user and the received user's uttered voice; and performing the voice recognition based on the user pronunciation lexicon that corresponds to the identified user.

According to one or more exemplary embodiments, the voice recognition rate and voice recognition service usability may be improved by performing the voice recognition by using the pronunciation lexicon updated based on the user pronunciation pattern. Further, the performance speed and accuracy of the device will be improved.

BRIEF DESCRIPTION OF THE DRAWINGS

FIGS. 4A, 4B, 5A, and 5B are views illustrating a method of extracting user pronunciation pattern according to an exemplary embodiment;

DETAILED DESCRIPTION OF EXEMPLARY EMBODIMENTS

Hereinafter, exemplary embodiments will be described in more detail with reference to the accompanying drawings.

Figure 1:
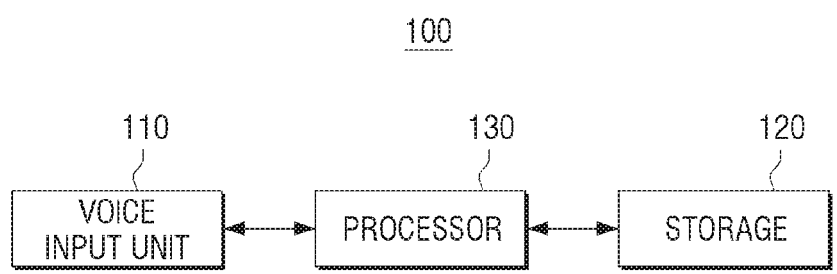
FIG. 1 is a block diagram illustrating a configuration of the electronic device according to an exemplary embodiment.

FIG. 1 is a block diagram illustrating a configuration of the electronic device according to an exemplary embodiment.

As shown in the FIG. 1, the electronic device 100 according to an exemplary embodiment may include a voice input unit 110 (e.g., voice inputter), a storage 120, and a processor 130.

The electronic device 100 according to an exemplary embodiment may be embodied in various electronic devices capable of voice recognition such as a display device like a smart TV, a smart phone, a tablet PC, an audio device, navigation, and the like.

The voice input unit 110 may receive a user's uttered voice. For example, the voice input unit 110 may be embodied in a microphone to receive the user's uttered voice. The voice input unit 110 may be embodied in an integrated form with the electronic device 100 by being equipped with or in a separate form by being apart from.

The voice input unit 110 may process the received user's uttered voice. For example, the voice input unit 110 may remove a noise from the user's voice. The voice input unit 110, when a user's voice in an analog form is inputted, may perform sampling and convert it to a digital signal. Further, the voice input unit 110 may calculate energy of the converted digital signal and determine whether the energy of the digital signal is more than a predetermined value.

The voice input unit 100, in a case in which the energy of the digital signal is more than a predetermined value, may remove a noise element from the digital signal and deliver to the processor 130 and the like. For example, the noise element is an accidental noise that can occur in a home environment, which may include sounds of an air conditioner, vacuum cleaner, music, and the like. Meanwhile, in a case in which the energy of the digital signal is less than a predetermined value, the voice input unit 110 does not perform any particular process procedures toward the digital signal but waits for other input. Therefore, since the whole audio process procedures are not activated due to other sounds rather than a user's uttered voice, unnecessary power consumption may be prevented.

The storage 120 may store a user pronunciation lexicon. The storage 120 may be a storing medium that stores the user pronunciation lexicon, which is used to perform voice recognition and may be embodied in a memory, a Hard Disk Drive (HDD), and the like. For example, the storage 120 may equip a ROM to store programs to perform an operation of the processor 130 and a RAM to store data according to an operation performance of the processor 130 temporarily, and the like. In addition, it may further equip Electrically Erasable and Programmable ROM (EEPROM) to store various reference data.

For example, the storage 120, with regard to a word of "Hanwha Eagles", may store pronunciation strings of "Hanwha Eagles", "Hanwha Eagless", "Hanwa eagles", and the like. In other words, the storage 120 may store many possible pronunciation strings of a particular word that various people may pronounce in many different ways. Especially, more pronunciation strings may be stored for a loanword since it is generally pronounced in more various ways than a native language. For example, the storage 120, with regard to a word of "national geographic", may store various pronunciation strings of "national geographic", "nashonal geographic", "nashonaal geographic", "naational geographic", "naashonaal geographic", etc.

The storage 120 may store a pronunciation lexicon per a plurality of users. In a case in which the number of users who use the electronic device 100 is plural, the storage 120 may store the pronunciation lexicon per a plurality of users, and the processor 130 may perform the voice recognition based on the user pronunciation lexicon. In addition, the storage 120, when the storage 120 is updated by the processor 130, may store the pronunciation lexicon per updated user.

The processor 130 may extract a user pronunciation pattern from a user's uttered voice and update a user pronunciation lexicon. Specifically, it may calculate reliability per phoneme included in a user's uttered voice and extract user pronunciation pattern-based on the calculated reliability. Here, the pronunciation pattern may be presented as a set of phoneme included in a user's uttered voice, and the phoneme means the smallest sound unit that distinguishes a meaning of a word. In addition, the reliability per phoneme is a value representing a degree of the similarity between a phoneme included in a user's uttered voice and a particular predetermined phoneme, and the higher the reliability per phoneme is, the more similar the phoneme in the user's uttered voice to the particular predetermined phoneme becomes.

The reliability per phoneme may be calculated by comparing a pronunciation per phoneme stored in the user lexicon and a pronunciation per phoneme included in a user's uttered voice. For example, the processor 130, in accordance with similarity between the pronunciation per phoneme stored in the pronunciation lexicon and the pronunciation per phoneme included in the user's uttered voice, may give a high weight value in a case in which the similarity is high and give a low weight value if the similarity is low. In addition, the weight value may have a value between 0 and 1, and it may have a value bigger than 0.5 in a case in which the similarity is high and may have a value lower than 0.5 in a case in which the similarity is low. However, the weight value is not limited thereto, and it also may have a value bigger than 1.

The processor 130 may calculate reliability per phoneme by giving a different weight value per type of a phoneme included in the user's uttered voice. Specifically, in a case in which a type of a phoneme included in the user's uttered voice is identical to the type of a phoneme stored in the pronunciation lexicon, a high weight value may be given, and a in case in which a type of a phoneme included in user's uttered voice is different to the type of a phoneme stored in the pronunciation lexicon, a low weight value may be given. An exemplary embodiment in which the processor 130 gives different weight values per type of phoneme will be described thereinafter with the FIG. 3.

The processor 130 may update the user pronunciation lexicon according to the pronunciation pattern rule generated based on the user pronunciation pattern. Here, the pronunciation pattern rule is a rule that a user repeats his or her pronunciation habit or characteristic, for example, in a case in which a user pronounces "Hanwha Eagles" and "Jigu Onnanwha" as "Hanwa Eagles" and "Jigu Onnanwa", the processor 130, based on the user pronunciation pattern, may generate a pronunciation pattern rule that user pronounce 'wh' after 'n' as 'w'.

The processor 130 may generate a variation rule for a predetermined word based on the pronunciation pattern rule generated based on the user pronunciation pattern and update the user pronunciation lexicon based on the generated variation rule. Here, the variation rule means a pronunciation pattern in a case in which a user pronounces a particular word in a different way of the stored pronunciation pattern rule.

In this case, the processor 130 may delete a pronunciation string that a user does not use for more than a predetermined number of times among pronunciation strings stored in the user pronunciation lexicon and update the user pronunciation lexicon by adding to the pronunciation lexicon or modifying a pronunciation string that are not stored in the user pronunciation lexicon among pronunciation strings generated based on the pronunciation pattern rule. For example, "Hanwha Eagles", "Hanwha Eaglss", "Hanwa Eagles", and "Hanwa Eaglss" are stored as pronunciation strings of "Hanwha Eagles" in the pronunciation lexicon, and in a case in which a predetermined number of times are 10, and a user's uttered voice is recognized only as either "Hanwa Eagles" or "Hanwa Eaglss" for more than 10 times, the processor 130 may delete "Hanwha Eagles" and "Hanwha Eaglss" among the pronunciation strings of "Hanwha Eagles" from the pronunciation lexicon. Accordingly, "Hanwa Eagles" and "Hanwa Eaglss" are the only remained pronunciation strings of "Hanwha Eagles", and voice misrecognition of the electronic device 100 may be reduced.

The processor 130 may update the pronunciation lexicon through a cloud sever. Specifically, when a user is identified based on user identification information (for example, login information) or received user's uttered voice, the user pronunciation lexicon corresponding to the identified user among a plurality of the pronunciation lexicons per user stored in the cloud sever may be received. Afterwards, the processor 130 may perform voice recognition by using the pronunciation lexicon received. The processor 130 may extract the pronunciation pattern from the user's uttered voice received while performing voice recognition and update the pronunciation lexicon per user stored in the cloud server according to the pronunciation pattern rule generated based on the extracted pronunciation pattern.

Thereinafter, an exemplary embodiment of the processor 130 performing voice recognition may be provided.

According to an exemplary embodiment, the processor 130 may recognize and convert the receive user's uttered voice into texts. In this case, the processor 130 may convert the user's uttered voice into texts by using Speech to Text (STT) algorithm. The processor 130 may extract a word corresponding to the converted text by comparing a phoneme included in the converted text with a phoneme stored in the user pronunciation lexicon. Specifically, the processor 130, by measuring a similarity between a phoneme included in the converted text and a phoneme stored in the user pronunciation lexicon and granting reliability to each phoneme, may extract the word corresponding to the user's uttered voice from the user pronunciation lexicon and perform voice recognition.

The processor 130 may perform voice recognition by using an external clouds server. Specifically, the processor 130 may transmit a voice signal corresponding to the received user's uttered voice to the cloud server, and the cloud server may perform voice recognition based on the voice signal and transmit the voice recognition result back to the electronic device 100, and the processor 130 may perform an operation corresponding to the received voice recognition result.

The processor 130, in a case in which pronunciation lexicons per a plurality of users are stored in the storage 120, may determine the pronunciation lexicon applicable to the voice recognition based on the user identification information (for example, login information) or the user's uttered voice received through the voice input unit 110. Specifically, the processor 130 may identify a user from the user identification information or received user's uttered voice and perform voice recognition based on the user pronunciation lexicon corresponding to the identified user.

The storage 120 and the processor 130 of the electronic device 100 according to an exemplary embodiment may be provided to a cloud server. Specifically, the cloud server may store a user pronunciation lexicon, extract a user pronunciation pattern from the uttered voice received from the electronic device 100, and update the user pronunciation lexicon according to the pronunciation pattern rule generated based on the extracted pronunciation pattern. In this case, the electronic device 100 may receive a user pronunciation lexicon stored in a cloud server and perform voice recognition for the user's uttered voice.

Figure 2A:
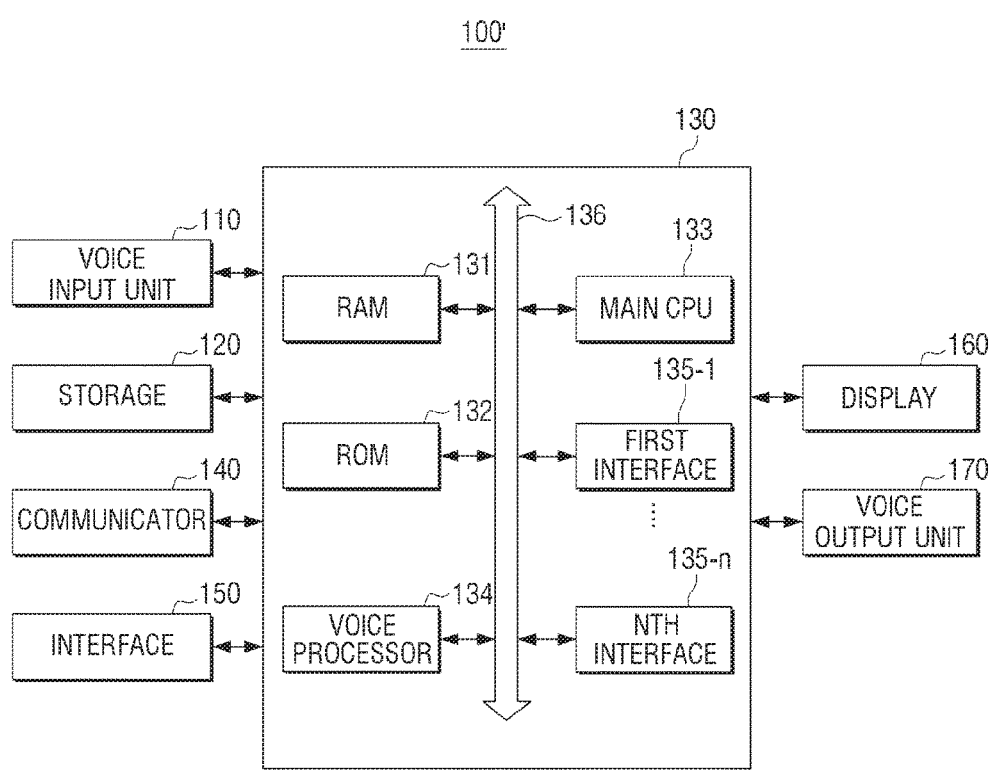
FIGS. 2A to 2C are block diagrams illustrating detailed configurations of the electronic device according to an exemplary embodiment.
Figure 2B:
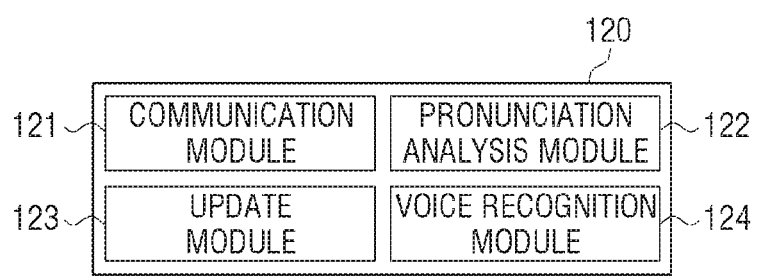
Figure 2C:
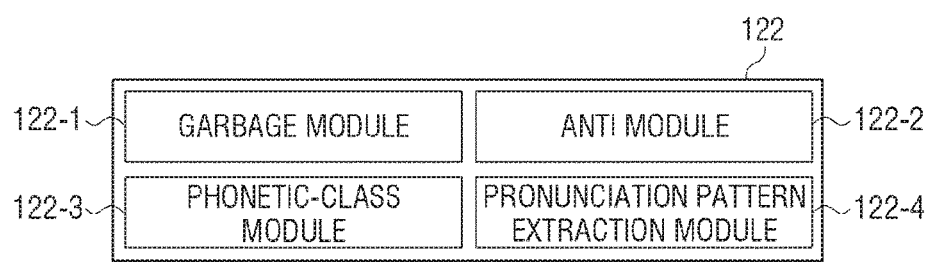

FIG. 2A to 2C are block diagrams presenting detailed configurations of the electronic device according to an exemplary embodiment.

Referring to the FIG. 2A, the electronic device 100 may include a voice input unit 110, a storage 120, a controller 130, a communicator 140, a display 150 and a voice output unit 170. No description on the overlapped features illustrated in the FIG. 1 among features illustrated in the FIG. 2A will be provided.

The processor 130 controls operations of the electronic device 100' overall. Specifically, the processor 130 may include a RAM 131, a ROM 132, a main CPU 133, a voice processor 134, the first to $n^{th}$ interface 135-1~135-n, and a bus 136.

The RAM 131, the ROM 132, the main CPU 133, the voice processor 134, the first to $n^{th}$ interface 135-1~135-n may be connected to each other through the bus 136.

The first to $n^{th}$ interface 135-1~135-n are connected to each component stated above. One of the interfaces may be a network interface that is connected to an external device through a network.

The main CPU 133 accesses the storage 120 and performs booting by using an O/S stored in the storage 120. Further, it performs various operations by using various programs, contents, data, and the like, which are stored in the storage 120.

A set of commands for system booting is stored at the ROM 132. When a turn-on command is inputted and power is supplied, the main CPA 133 copies the O/S stored in the storage 120 according to a command stored in the ROM 132 onto the RAM 131 and boots up the system by performing the O/S. Once the booting is completed, the main CPU 133 copies various application programs stored in the storage 120 onto the RAM 131 and performs various operations by operating the application programs copied onto the RAM 131.

The voice processor 134 may process the received user's uttered voice. For example, the voice processor 134 may remove a noise from the user's voice. Specifically, the voice processor 134, when a user's voice in an analogue form is received, may perform sampling and convert it to a digital signal. Further, the voice processor 134 may calculate energy of the converted digital signal and determine whether the energy of the digital signal is more than a predetermined value.

The voice processor 134, when energy of a digital signal is more than a predetermined value, may remove a noise element from the digital signal and deliver to the processor 130 and the like. For example, a noise element is an accidental noise that can occur in a home environment, which may include sounds of an air conditioner, vacuum cleaner, music, and the like. Meanwhile, in a case in which the energy of the digital signal is less than a predetermined value, the voice processor 134 does not perform any particular process procedures toward the digital signal but waits for other input. Therefore, since the whole audio process procedures are not activated due to other sounds rather than a user's uttered voice, unnecessary power consumption may be prevented.

Meanwhile, the operation of the processor 130 may be performed with a program stored in the storage 120 as shown in the FIG. 2C.

The storage 120 stores various data such as an Operating System (O/S) software module for operating the electronic device 100' and various kinds of multimedia contents.

The storage 120 may store a communication module 121, a pronunciation analysis module 122, an update module 123, a voice recognition module 124, and the like, which are used to update a user pronunciation lexicon according to an exemplary embodiment as shown in the FIG. 2B.

The processor 130 may receive a user pronunciation lexicon corresponding to a user of the electronic device 100 from an external cloud server by using the communication module 121 or transmit an updated user pronunciation lexicon to a cloud server.

The processor 130 may extract a user pronunciation pattern from a received uttered voice by using the pronunciation analysis module 122 and generate a pronunciation pattern rule. Here, the pronunciation analysis module 122 may be comprised of a garbage module 122-1, an anti module 122-2, a phonetic-class module 122-3, and a pronunciation pattern extraction module 122-4, and the like as shown in the FIG. 2C. Specifically, the processor 130 may use the garbage module 122-1, the anti module 122-2, and the phonetic-class module 122-3 among the pronunciation analysis modules 122 and calculate reliability per phoneme included in the user's uttered voice and may extract the pronunciation pattern-based on the calculated reliability by using the pronunciation pattern extraction module 122-4. Here, the garbage module 122-1 extracts reliability per phoneme in a way of excluding pronunciation which is different from the user's uttered voice, and the anti module 122-2 calculates reliability per phoneme in a way of giving different reliability according to a degree of a similarity to the user's uttered voice, and the phonetic-class module 122-3 calculates reliability per phoneme in a way of grouping similar pronunciations and giving reliability according to which pronunciation group the pronunciation of the user's uttered voice belongs to.

For example, the processor 130, when the user's uttered voice is received, calculates reliability per phoneme included in the user's uttered voice according to one of the garbage module 12201, the anti module 122-2, and the phonetic-class module 122-3, which constitute the pronunciation analysis module 122, extracts the pronunciation pattern-based on the calculated reliability by using the pronunciation pattern extraction module 122-4, and updates the user pronunciation lexicon according to the pronunciation pattern rule generated based on the extracted pronunciation pattern. In this case, the processor 130 may update the user pronunciation lexicon by using the communication module 121.

The processor 130 may update the user pronunciation lexicon by using the update module 123. Specifically, when the pronunciation pattern rule is generated by the pronunciation analysis module 122, the update module 123, based on the generated pronunciation pattern rule and the pronunciation string which is pre-stored in the user pronunciation lexicon, may delete the pronunciation string that is not used for more than a predetermined number of times and may update the user pronunciation lexicon by modifying the pronunciation string which is pre-stored in the user pronunciation lexicon or adding to the user pronunciation lexicon for the pronunciation string that is not stored in the user pronunciation lexicon.

The processor 130 may perform voice recognition for the user's uttered voice by using the voice recognition module 124. Specifically, the processor 130 may compare the received user's uttered voice with the pronunciation string which is pre-stored in the user pronunciation lexicon and extract the reliability per phoneme and may recognize the pronunciation string composed of phonemes with high reliability per phoneme as the user's uttered voice.

The communicator 140 performs communication with an external device such as a cloud server. When a user pronunciation lexicon is updated according to the pronunciation pattern rule generated in the processor 130, it may transmit the updated pronunciation lexicon to the cloud server. For this, the communicator 140 may include a short distance wireless communication module including Bluetooth and Zigbee and various wireless communication modules including Wi-Fi, IEEE, $3^{rd}$ Generation (3G), $3^{rd}$ Generation Partnership Project (3GPP), Long Term Evolution (LTE), LTE Advanced (LTE-A), and the like.

The interface unit 150 receives various user inputs. Especially, the interface unit 150 may receive various user inputs such as identification information for identifying a user or kinds of language, and the like.

The interface unit 150 may be embodied in various forms according to exemplary embodiments of the electronic device 100. For example, the interface unit 150 may be embodied in a microphone through which a user's voice, a touch display, a keyboard, and the like are inputted but not limited thereto.

The electronic device 100 according to another exemplary embodiment may include a display 160 or a voice output unit 170 in order to provide an interactive voice recognition feature.

The display 160 may be embodied in a Liquid Crystal Display (LCD), an Organic Light Emitting Display (OLED), or a Plasma Display Panel (PDP), and the like, and provide various display screens that can be provided through the electronic device 100. Especially, the display 160 may display a response message corresponding to the user's voice in a text or an image.

The voice output unit 170 may be embodied in an output port like a jack or a speaker and may output a response message corresponding to the user's voice in voice.

Figure 3:
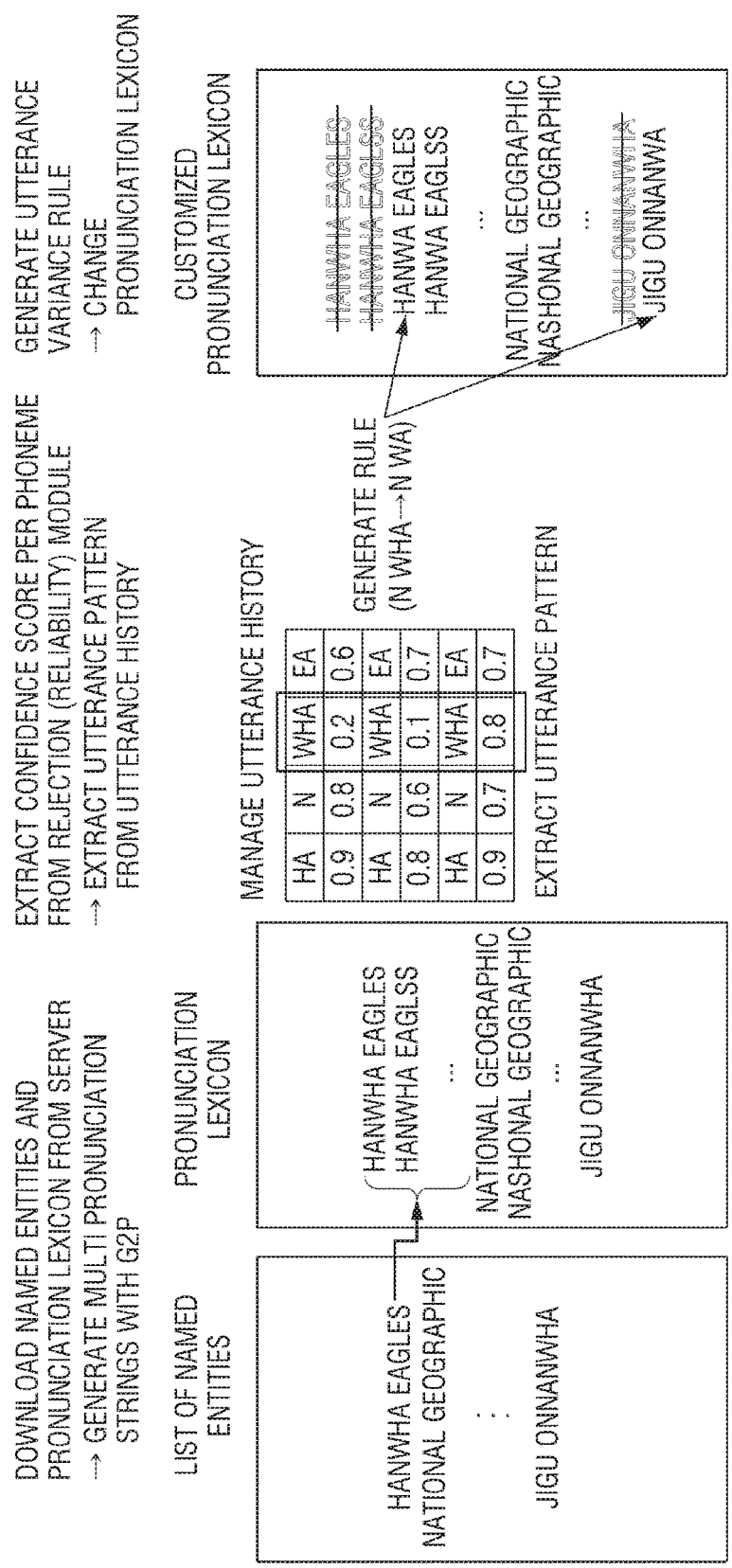
FIG. 3 is a view illustrating a method of extracting the user pronunciation pattern and updating the pronunciation lexicon according to an exemplary embodiment.

FIG. 3 is a view illustrating a method of extracting the user pronunciation pattern and updating the pronunciation lexicon according to an exemplary embodiment.

Referring to the FIG. 3, updating the pronunciation lexicon of the electronic device 100 according to an exemplary embodiment will be described below.

With reference to the FIG. 3, the user pronunciation lexicon stored in the storage 120 may store a list of named entities and a pronunciation string corresponding to each named entity. For example, for the pronunciation string corresponding to a named entity called "Hanwha Eagles", "Hanwha Eagles", "Hanwha Eaglss", "Hanwa Eagles", "Hanwa Eaglss", and the like, may be stored.

According to an exemplary embodiment, when a pronunciation string of "Hanwa Eagles" is received from a user, the processor 130 compares the pronunciation per phoneme included in the user's uttered voice and the pronunciation per phoneme stored in the pronunciation lexicon and gives a weight values according to the similarity. Specifically, since the uttered voice received from a user is "Hanwa Eagles", it may include phonemes of "ha", "n", "wa", "ea", "g", "l", and "s". In this case, since a phoneme corresponding to "wa" among other received phonemes is similar to "wa", the weight value of 0.2 may be given to "wha", and the weight value of 0.8 may be given to "wa". Accordingly, the processor 130 may recognize that the user pronunciation pattern for "Hanwha Eagles" is "Hanwa Eagles" and may delete a phoneme string including "Hanwha" stored in the pronunciation lexicon. As a result, only the phonemes string of "Hanwa" is remained in the pronunciation lexicon, and the processor 130 may recognize "Hanwha Eagles" more accurately in a case in which a user pronounces "Hanwha Eagles" as "Hanwa Eagles" or "Hanwa Eaglss".

The processor 130 may extract a pronunciation pattern of pronouncing consecutive "h" which comes after "n" as "w" from the user pronunciation pattern of pronouncing "Hanwha Eagles" as "Hanwa Eagles" and may update the pronunciation lexicon by modifying consecutive "h" which comes after "n" to "w" or deleting consecutive "h" which comes after "n". For example, among pronunciation strings of "Jigu Onnanwha", it may delete "Jigu Onnanwha" and add "Jigu Onnanwa". The above exemplary embodiment is merely an exemplary embodiment, and therefore, exemplary embodiments are not limited to the above exemplary embodiment, and the voice recognition for various named entities may be performed in various ways.

The processor 130 performs voice recognition by applying a different pronunciation lexicon per user. In this case, the processor 130 may identify a user based on the identification information inputted by the user through the interface unit 150 or identify a user by using the user's uttered voice received by the voice input unit 110. The processor 130, when a user is identified, may perform voice recognition based on the user pronunciation lexicon corresponding to the identified user. In addition, when the pronunciation lexicon is stored in a cloud server, the processor 130, when a user is identified, may receive the user pronunciation lexicon corresponding to the identified user and perform voice recognition by using the pronunciation lexicon received.

FIG. 4A, FIG. 4B, FIG. 5A, and FIG. 5B are views describing a method of extracting user pronunciation pattern according to an exemplary embodiment.

Referring to the FIG. 4A, for example, when a user has a habit of pronouncing consecutive "h" which comes after a consonant "n" as "w", the processor 130 may extract a pronunciation pattern that user pronounces "Hanwha Eagles" as "Hanwa Eagles" or "Hanwa Eaglss". In this case, the processor 130 may delete phoneme strings that include "Hanwha" such as "Hanwha Eagles", "Hanwha Eaglss", and the like, among phoneme strings of "Hanwha Eagles" in the pronunciation lexicon. Accordingly, the processor 130 may be able to recognize "Hanwha Eagles" more accurately even when a user pronounces "Hanwa Eagles" or "Hanwa Eagles". In addition, unnecessary phonemes strings may be deleted so that the storage area may be utilized efficiently.

Referring to the FIG. 4B, the user pronunciation lexicon may be updated by calculating reliability per phoneme included in the user's uttered voice. For example, in a case in which a user is poor in pronouncing "h" and "eu" pronunciations and pronounces "Hanwha Eagles" as "Hanwa Eaguls", the processor 130 may generate a pronunciation pattern rule that a user pronounces "h" as "w" and "eu" as "u" and update user pronunciation lexicon according to the generated pronunciation pattern rule. Accordingly, pronunciation strings including "h" or "eu" among other pronunciation strings stored in the user pronunciation lexicon may be modified to as "w" or "u". For example, a pronunciation string of "saehayan geurim" stored in the user pronunciation lexicon may be modified to "saeayan gurim", or a pronunciation string of "saeayang gurim" may be added.

Figure 5A:
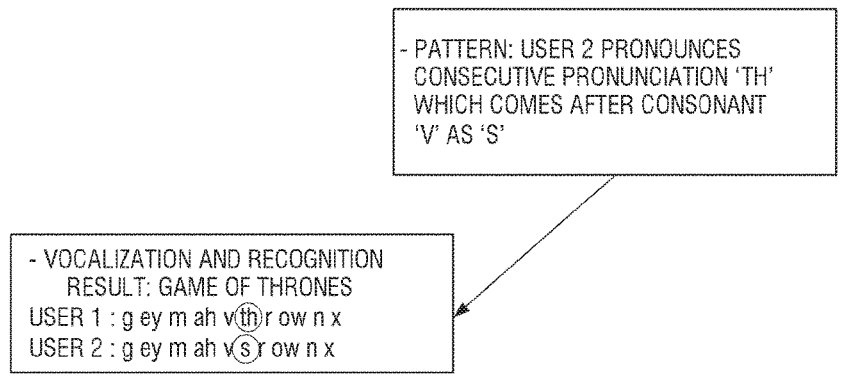

Like as the FIG. 5A and FIG. 5B, even in a case in which the user's uttered voice is in English, it may be applied the same. For example, in a case in which a user has a habit of pronouncing "th" as "s", the processor 130 may extract a pronunciation pattern that the user pronounces "Game of Thrones" as "gae im ov srownx". In this case, the processor 130 may delete a phoneme string which includes "thrown" among phoneme strings of "Game of Thrones" in the pronunciation lexicon. In addition, in a case in which a phoneme string of "gae im ov srownx" is not stored in the pronunciation lexicon, "gae im ov srownx" may be added to the phoneme strings of "Game of Thrones".

Figure 6:
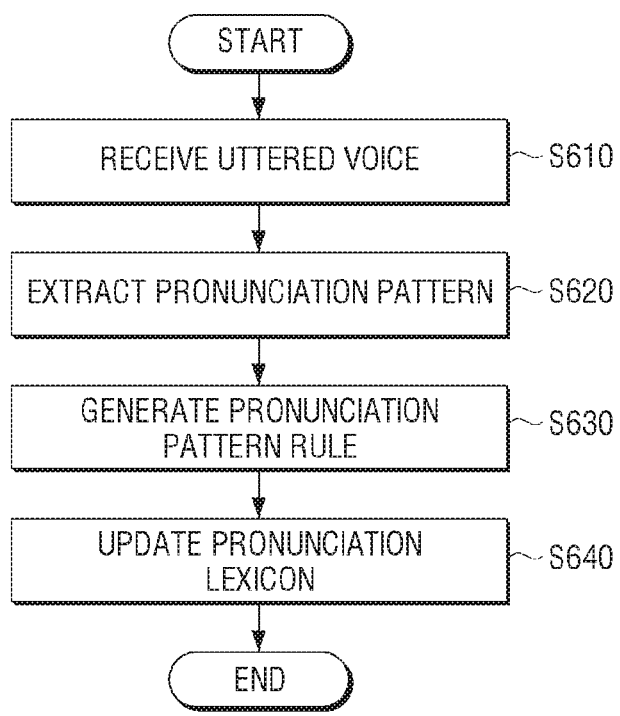
FIG. 6 is a flowchart illustrating a voice recognition method according to an exemplary embodiment.

FIG. 6 is a flowchart illustrating the voice recognition method according to an exemplary embodiment.

Referring to the FIG. 6, first, an uttered voice is received from a user S610.

Next, a user pronunciation pattern is extracted from the received uttered voice S620. Here, the pronunciation pattern may calculate reliability per phoneme included in the user's uttered voice and may be extracted based on the calculated reliability per phoneme.

Next, a pronunciation pattern rule is generated based on the extracted pronunciation pattern S630, and a pronunciation lexicon is updated according to the generated pronunciation pattern rule S640.

When a user's uttered voice is received, voice recognition may be performed based on the stored user pronunciation lexicon.

Figure 7:
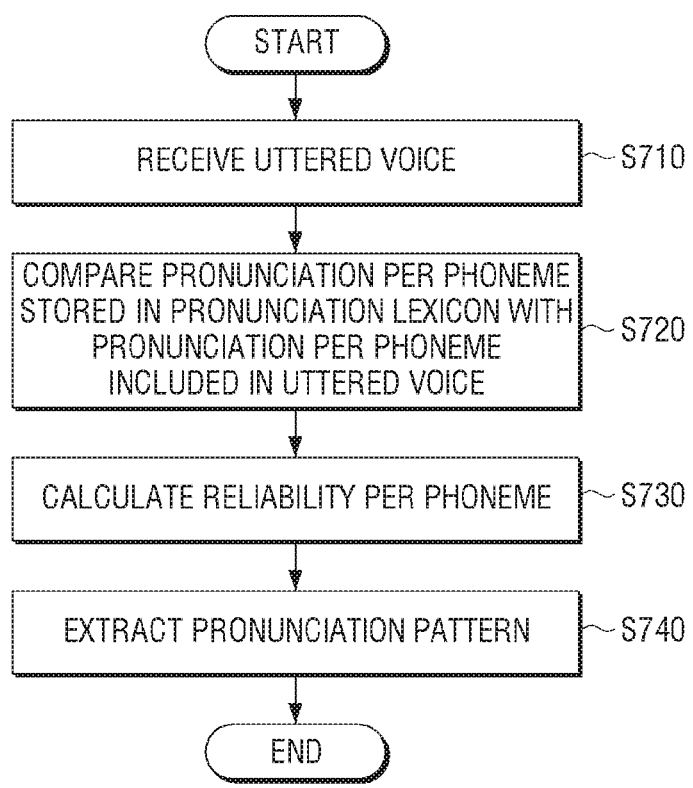
FIGS. 7 and 8 are flowcharts illustrating a method of calculating reliability per phoneme according to an exemplary embodiment.
Figure 8:
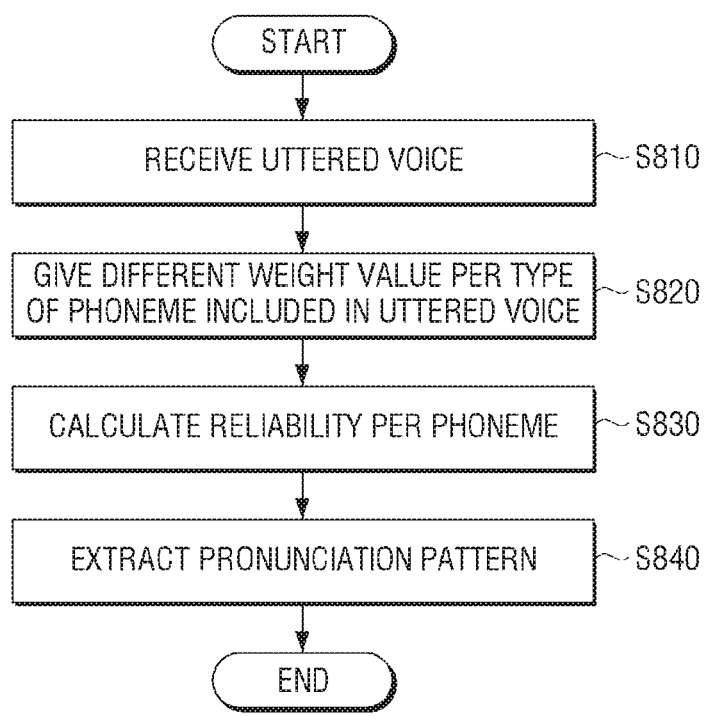

FIGS. 7 and 8 are flowcharts describing a detailed method of calculating reliability per phoneme according to an exemplary embodiment.

Referring to the FIG. 7, first, an uttered voice is received from a user S710. Next, a pronunciation per phoneme stored in the pronunciation lexicon and a pronunciation per phoneme included in the user's uttered voice are compared to each other S720. In this case, a weight value according to the similarity between the pronunciation per phoneme stored in the pronunciation lexicon and the pronunciation per phoneme included in the uttered voice may be granted. Next, reliability per phoneme is calculated according to the given weight value S730. In this case, the more similar the pronunciation per phoneme is, the higher value it can have. Next, the pronunciation pattern is extracted based on the calculated reliability per phoneme S740.

Referring to the FIG. 8, first, an uttered voice is received from a user S810. Next, a different weight value per types of phoneme included in the uttered voice is given S820. In this case, a weight value may be given by considering the similarity between a pronunciation per phoneme stored in the pronunciation lexicon and a pronunciation per phoneme included in the user's uttered voice. Next, the reliability per phoneme is calculated according to the given weight value S830. Next, a pronunciation pattern is extracted based on the calculated reliability per phoneme S840.

Figure 9:
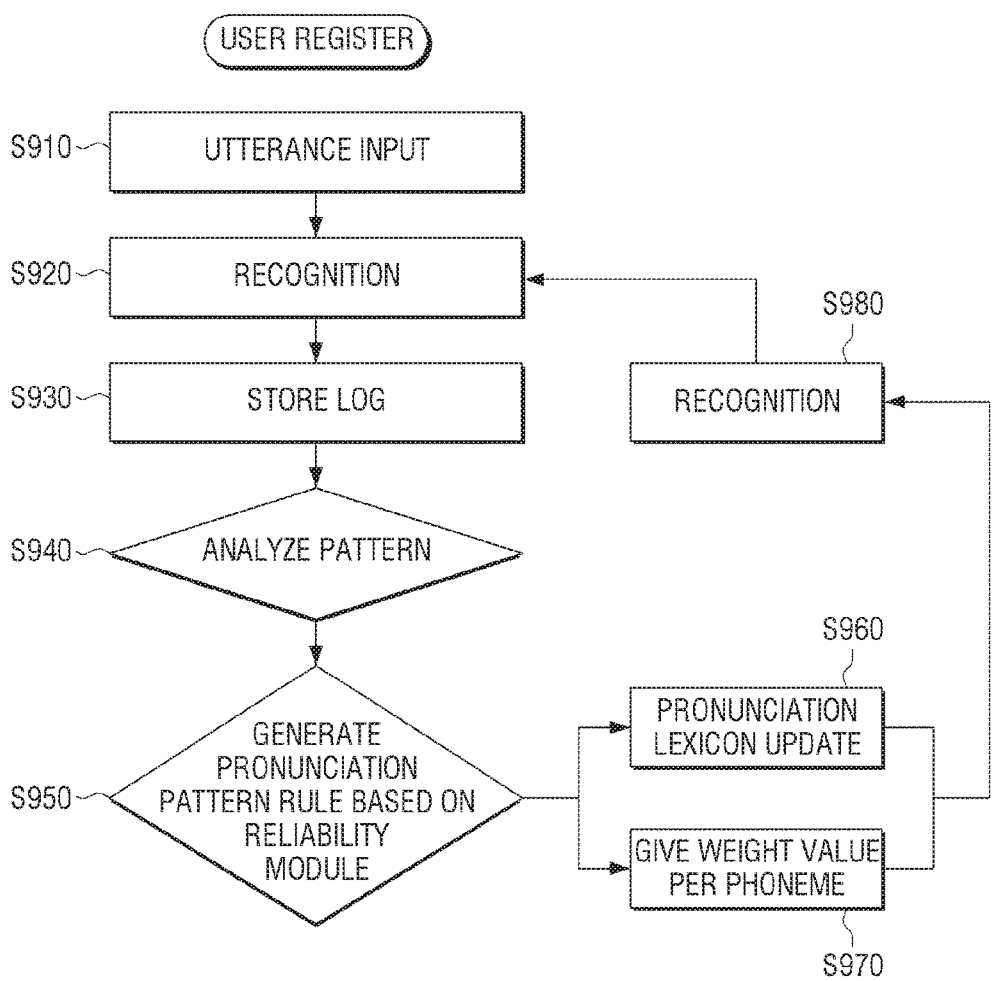
FIG. 9 is a flowchart illustrating a voice recognition performance process according to an exemplary embodiment.

FIG. 9 is a flowchart illustrating a voice recognition performance process according to an exemplary embodiment.

Referring to the FIG. 9, the electronic device, when an uttered voice is received from a user S910, voice recognition is performed based on the user pronunciation lexicon S920. Afterward, the recognized voice recognition result is stored in a log S930, a user pronunciation pattern is extracted, and the extracted pronunciation pattern is analyzed S940. In this case, the electronic device may calculate reliability per phoneme included in the user's uttered voice and extract a pronunciation pattern-based on the calculated reliability. In addition, the electronic device may compare the pronunciation per phoneme stored in the pronunciation lexicon and the pronunciation per phoneme which is included in the user's uttered voice and may calculate reliability per phoneme by giving a weight value according to the similarity.

The electronic device generates a pronunciation pattern rule based on the extracted pronunciation pattern S950 and updates the user pronunciation lexicon according to the generated pronunciation pattern rule S960. In addition, it may compare the pronunciation per phoneme stored in the pronunciation lexicon with the pronunciation per phoneme included in the user's uttered voice and calculate reliability per phoneme by giving a different weight value according to the similarity S970 and may extract a pronunciation pattern-based on the calculated reliability. The electronic device, when a user's uttered voice is received, may perform voice recognition based on the updated pronunciation lexicon S980.

According to one or more exemplary embodiments as described above, by using the pronunciation lexicon updated based on the user pronunciation pattern and performing the voice recognition, it may elevate the voice recognition rate and improve the quality of the voice recognition service.

The methods according to one or more exemplary embodiments may be embodied only by upgrading software of the existing electronic device.

A non-transitory computer readable medium in which a program performing the voice recognition sequentially according to the exemplary embodiments is stored may be provided.

For example, a non-transitory computer readable medium in which a program receiving user's uttered voice, extracting user pronunciation pattern from the received uttered voice, and updating the user pronunciation lexicon according to the pronunciation pattern rule generated based on the extracted pronunciation pattern is stored may be provided.

The non-transitory computer readable medium may refer to a medium that stores data semi-permanently and that is readable by a device. Specifically, the various applications or programs may be stored in and provided through a non-transitory computer readable medium such as a CD, a DVD, a hard disk, a blue-ray disc, a USB, a memory card, a ROM, and the like.

Although exemplary embodiments are illustrated and described, exemplary embodiments shall not be construed as being limited to the foregoing exemplary embodiments, and without departing from the principles and spirit of the scope of which is defined in the appended claims, many alternatives and variations will be apparent to those skilled in the art, and the alternatives and variations shall not be acknowledged independently from the technical idea and prospect of exemplary embodiments.

What is claimed is:
1. An electronic device comprising:
   a memory configured to store a user pronunciation lexicon;
   a voice inputter; and
   a processor configured to:
      control the voice inputter to receive a user voice,
      obtain a word corresponding to the user voice using the user pronunciation lexicon,
      obtain a first pronunciation for a phoneme included in the user voice,
      compare the first pronunciation and a second pronunciation pre stored for the word,
      identify a pronunciation pattern by using a result of the comparing, and update the user pronunciation lexicon according to a pronunciation pattern rule obtained based on the pronunciation pattern, wherein the pronunciation pattern rule is a rule that a user repeats according to at least one of a pronunciation habit of the user and a pronunciation characteristic of the user.

2. The electronic device as claimed in claim 1, wherein the processor is further configured to, in response to the user voice being received, perform voice recognition based on the user pronunciation lexicon stored in the memory.

3. The electronic device as claimed in claim 1, wherein the processor is further configured to calculate reliability per phoneme included in the user voice and obtain the pronunciation pattern based on the calculated reliability.

4. The electronic device as claimed in claim 3, wherein the processor is further configured to compare a pronunciation per phoneme stored in the user pronunciation lexicon and a pronunciation per phoneme included in the user voice and calculate reliability per phoneme by determining a weight value according to a similarity.

5. The electronic device as claimed in claim 4, wherein the processor is further configured to determine a different weight value according to the similarity per type of the phoneme included in the user voice and calculate the reliability per the phoneme based on the determined weight value.

6. The electronic device as claimed in claim 1, wherein the processor is further configured to generate a variation rule for a predetermined word based on the obtained pronunciation pattern rule and update the user pronunciation lexicon based on the generated variation rule.

7. The electronic device as claimed in claim 1, wherein the processor is further configured to delete a pronunciation string that the user does not use for more than a predetermined number of times among pronunciation strings stored in the user pronunciation lexicon and add the pronunciation string that is not stored in the user pronunciation lexicon among pronunciation strings generated based on the pronunciation pattern rule to the user pronunciation lexicon.

8. The electronic device as claimed in claim 1, further comprising:
   a communicator configured to perform communication with a cloud server,
   wherein the processor is further configured to transmit the user pronunciation lexicon updated according to the obtained pronunciation pattern rule to the cloud server.

9. The electronic device as claimed in claim 8, wherein the processor is further configured to identify the user based on at least one among identification information inputted by the user and the received user voice and perform voice recognition based on the user pronunciation lexicon that corresponds to the identified user.

10. A voice recognition method of an electronic device comprising:
   receiving a user voice;
   obtaining a word corresponding to the user voice using a user pronunciation lexicon,
   obtaining a first pronunciation for a phoneme included in the user voice,
   comparing the first pronunciation and a second pronunciation pre stored for the word,
   identifying a pronunciation pattern by using a result of the comparing,
   updating a user pronunciation lexicon according to a pronunciation pattern rule obtained based on the pronunciation pattern,
   wherein the pronunciation pattern rule is a rule that a user repeats according to at least one of a pronunciation habit of the user and a pronunciation characteristic of the user.

11. The method as claimed in claim 10 further comprising:
   in response to the user voice being received, performing the voice recognition based on the user pronunciation lexicon.

12. The method as claimed in claim 10, wherein the obtaining comprises calculating reliability per phoneme included in the user voice and obtains the pronunciation pattern based on the calculated reliability.

13. The method as claimed in claim 12, wherein the obtaining comprises comparing a pronunciation per phoneme stored in the user pronunciation lexicon and a pronunciation per phoneme included in the user voice and calculating the reliability per phoneme by determining a weight value according to a similarity.

14. The method as claimed in claim 13, wherein the obtaining comprises determining a different weight value according to the similarity per type of a phoneme included in the user voice and calculating the reliability per phoneme based on the determined weight value.

15. The method as claimed in claim 10, wherein the updating comprises generating a variation rule for a predetermined word based on the obtained pronunciation pattern rule and updating the user pronunciation lexicon based on the generated variation rule.

16. The method as claimed in claim 10, wherein the updating comprises deleting a pronunciation string that a user does not use for more than a predetermined number of time among the pronunciation strings stored in the user pronunciation lexicon and adding a pronunciation string that is not stored in the user pronunciation lexicon among the pronunciation strings generated based on the pronunciation pattern rule.

17. The method as claimed in claim 10, further comprising:
   transmitting the user pronunciation lexicon updated according to the obtained pronunciation pattern rule to a cloud server.

18. The method as claimed in claim 17, further comprising:
   identifying the user based on at least one among identification information inputted by the user and the received user voice; and
   performing the voice recognition based on the user pronunciation lexicon that corresponds to the identified user.

* * * * *